Figure 1:
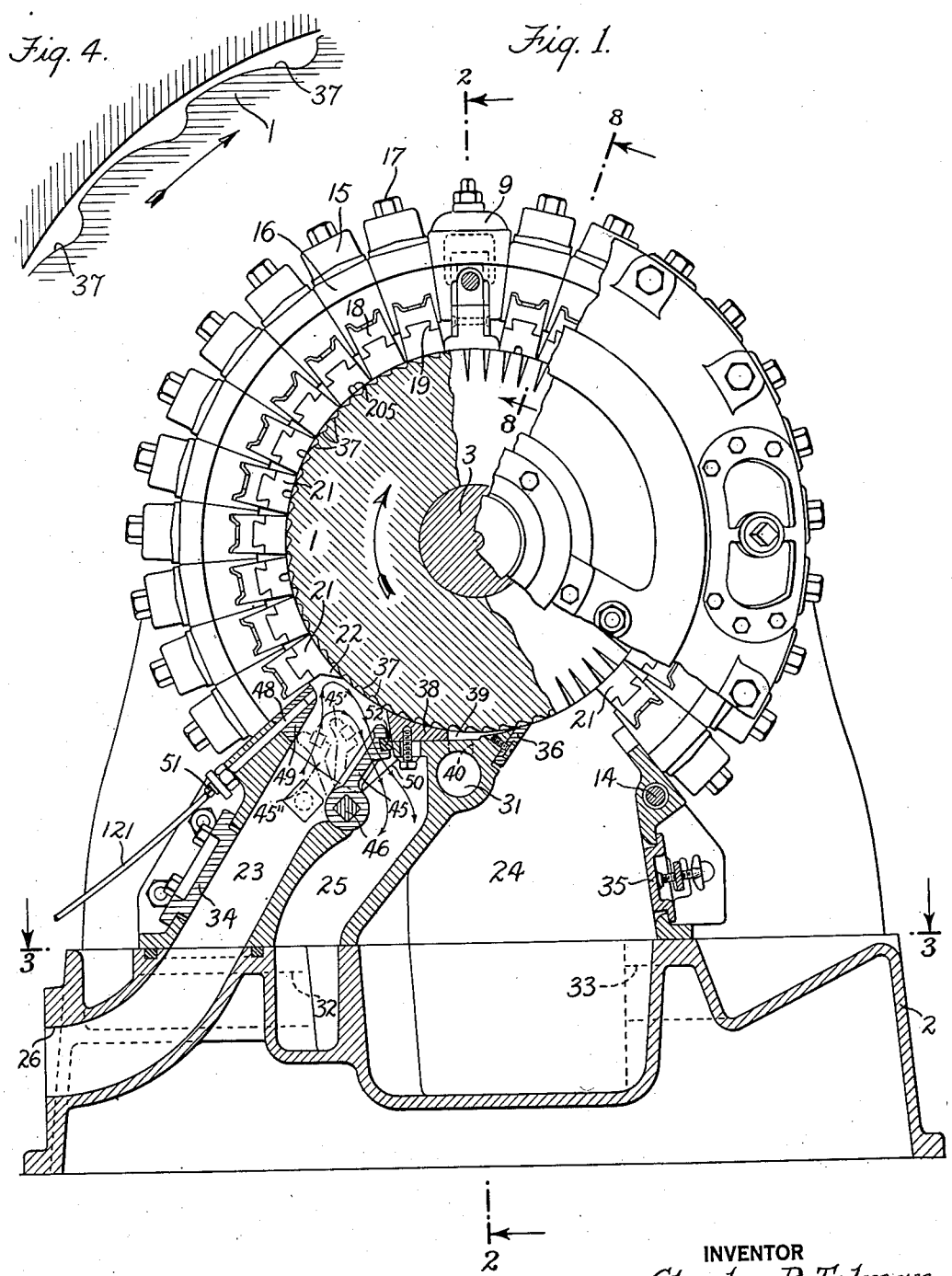

July 20, 1937.        C. P. TOLMAN        2,087,556
STUFF TREATMENT APPARATUS
Filed March 28, 1934        7 Sheets-Sheet 3

INVENTOR
Charles P. Tolman
BY
Blair, Curtis & Dunne
ATTORNEYS

July 20, 1937.  C. P. TOLMAN  2,087,556
STUFF TREATMENT APPARATUS
Filed March 28, 1934  7 Sheets-Sheet 4
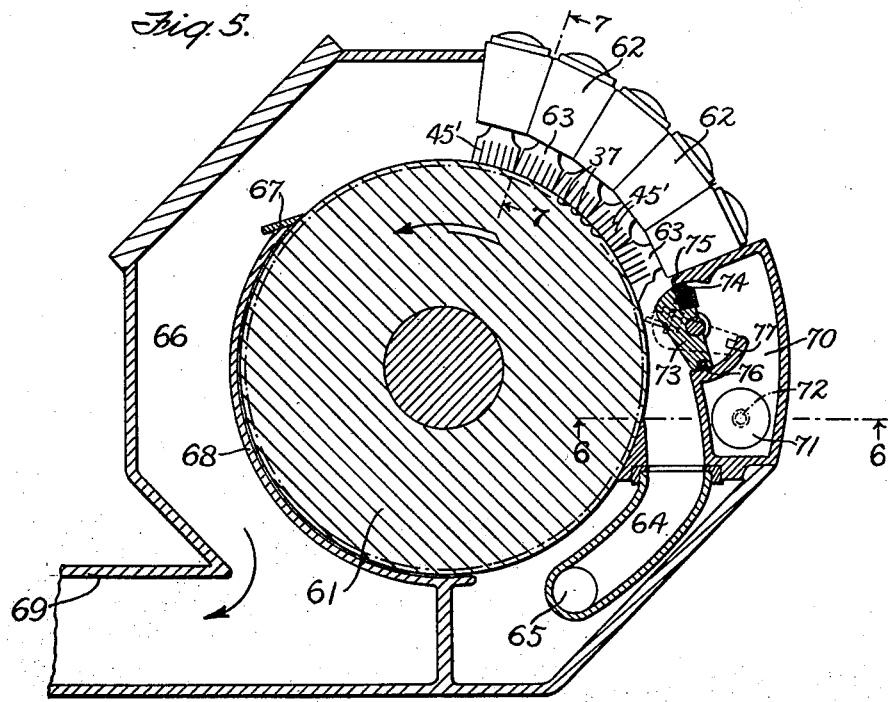
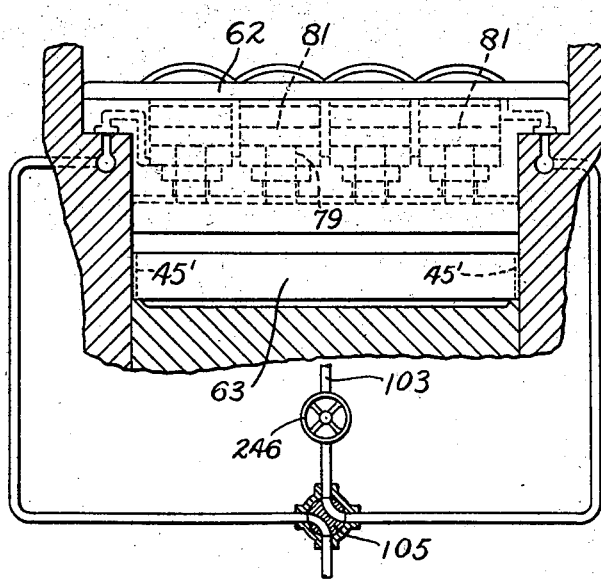
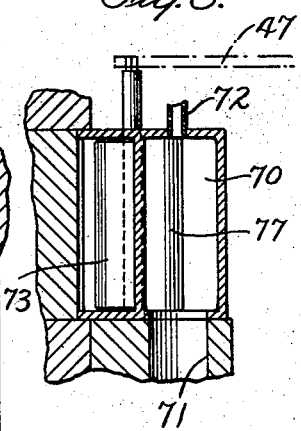
INVENTOR
Charles P. Tolman
BY
Blair, Curtis + Dunne
ATTORNEYS

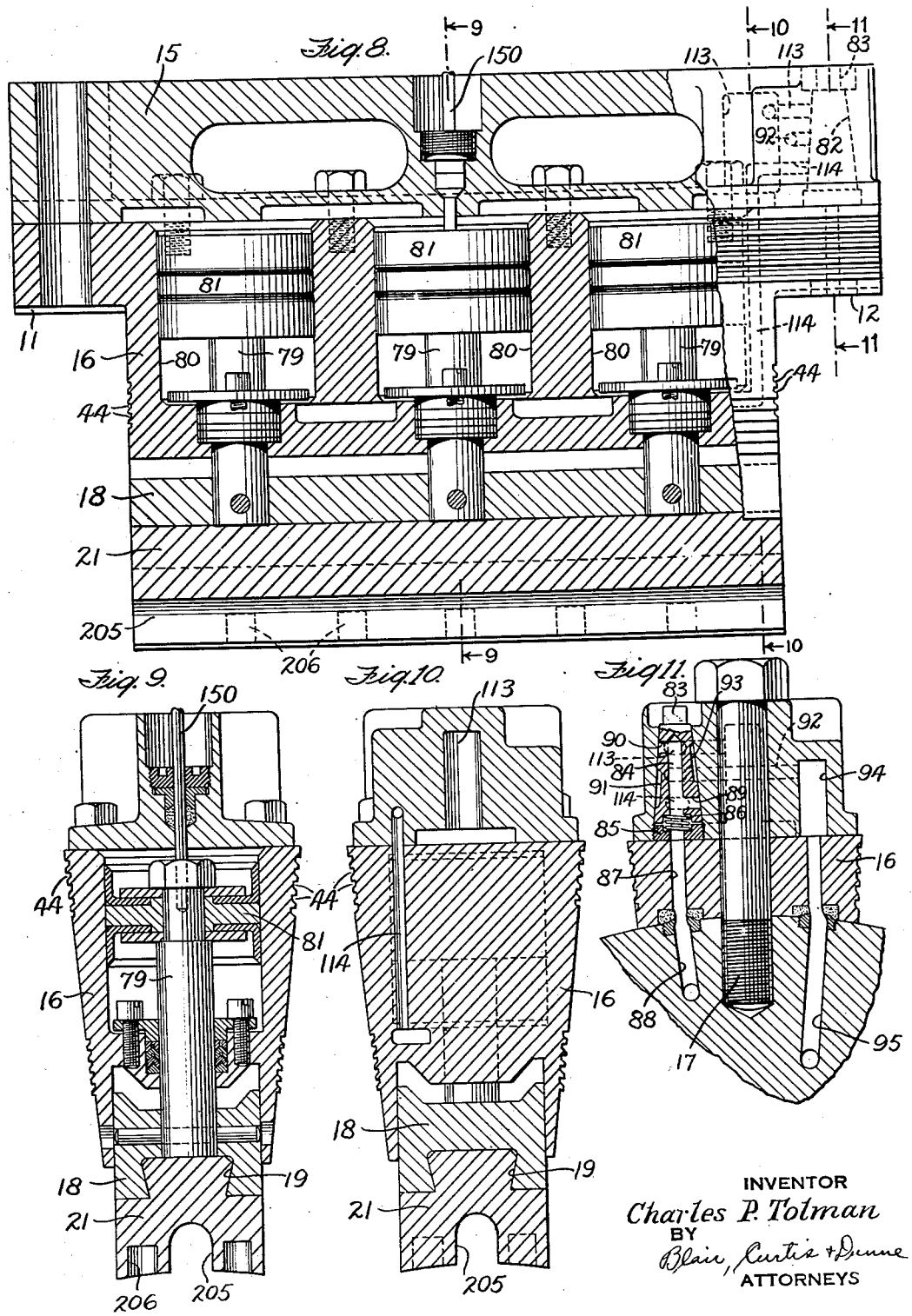

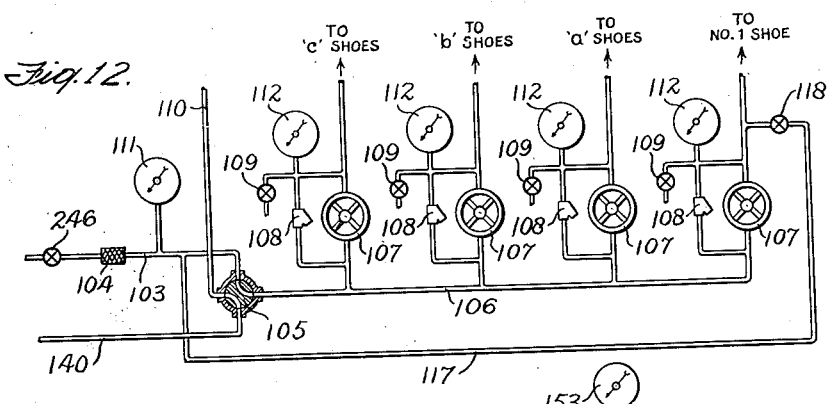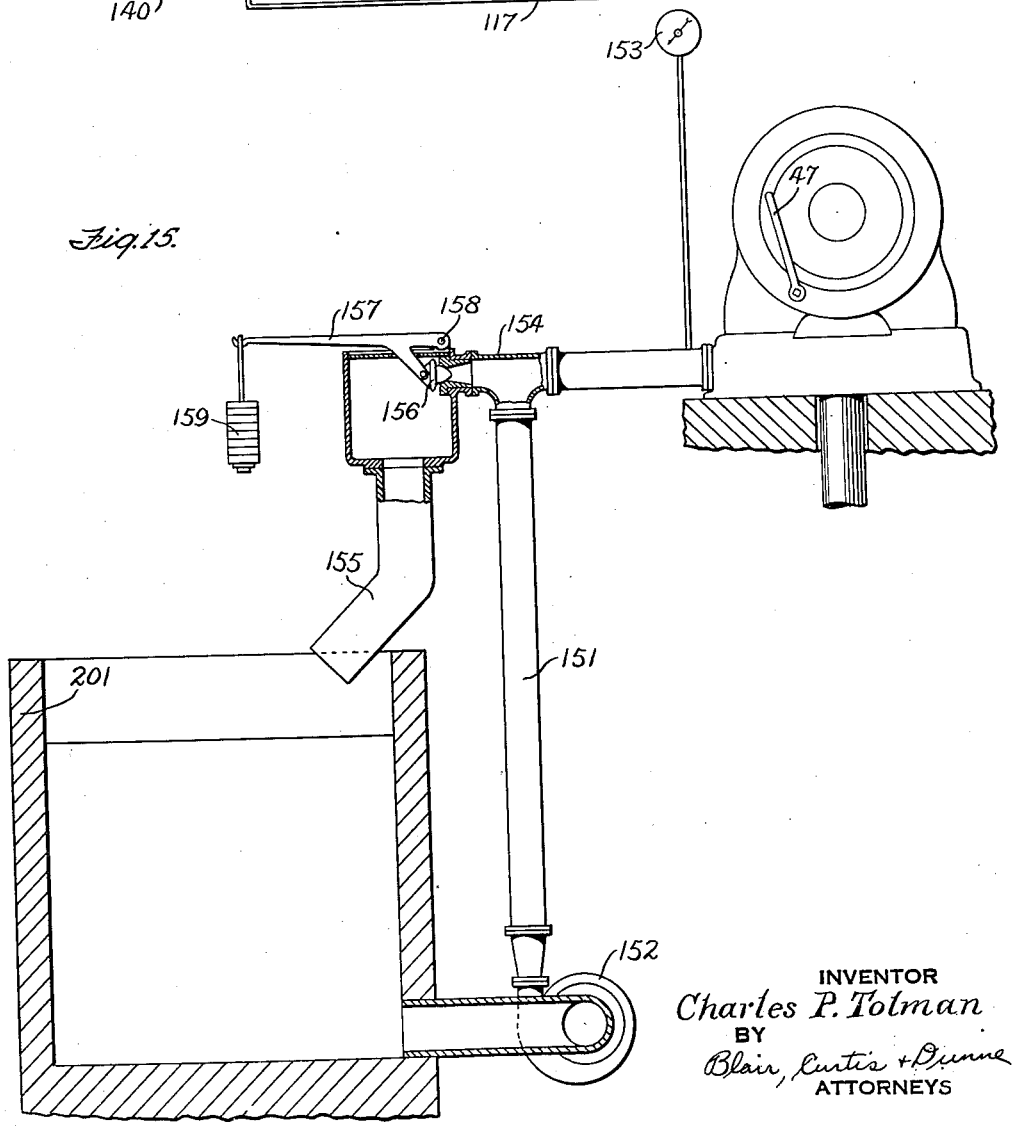

July 20, 1937.  C. P. TOLMAN  2,087,556
STUFF TREATMENT APPARATUS
Filed March 28, 1934   7 Sheets-Sheet 7

INVENTOR
Charles P. Tolman
BY
Blair, Curtis & Dunne
ATTORNEYS

Patented July 20, 1937

2,087,556

UNITED STATES PATENT OFFICE 2,087,556

STUFF TREATMENT APPARATUS

Charles P. Tolman, Kew Gardens, N. Y., assignor, by mesne assignments, to The Noble & Wood Machine Co., Hoosick Falls, N. Y., a corporation of New York Application March 28, 1934, Serial No. 717,717

13 Claims. (Cl. 92—26)

The present invention relates to an improvement in apparatus for stuff treatment wherein the material to be treated is passed in fluid form or in a fluid medium through a treatment zone and there subjected to suitable forces for producing the desired change of condition.

One object of my invention, in so far as it relates to treating fibrous cellulose material for making paper, board, or the like, has been to provide apparatus for defibering and "finishing" the stock wherein the character and/or extent of treatment thereof may be effectively controlled to produce a product having materially improved quality as compared to stocks treated in beaters of the Hollander or Jordan types for example. For a summary of more recent hypotheses bearing on cellulose treatment phenomena in paper making, I refer to a pamphlet by W. Boyd Campbell, entitled "The Cellulose Water Relationship in Paper Making", published 1933 by the Department of the Interior, Canada. In view of conflicting theories as to what takes place in preparing pulp for the paper or board machine, i. e. whether the effect is chemical and therefore hydration, or physical and therefore fibrillation and/or wetting or a combination of these, I employ the term "finishing" to designate generically the treatment applied to pulp or the like at the beater stage, it being understood, however, that the term is also used by me to include analogous treatment of other substances.

In accordance with my invention, where fibrous cellulose material of suitable consistency in a fluid medium is treated, I deliver a supply of the stock under pressure into contact with a portion of the peripheral surface of a high speed rotor provided with transverse peripheral grooves. For effective operation, the feed pressure used is sufficient to overcome the centrifugal counter force developed by rotation at high speeds, i. e. of the order of 5000 feet per minute or more. A quantity of stock is thus forced into each rotor groove and carried by the rotor into a film shearing gap or treating zone preferably formed between the rotor periphery and a suitable stator or stators spaced therefrom a distance of the order of .005 of an inch or less. In this zone the entire contents of each groove are subjected to a uniformly effective defibering and finishing action under pressure and then discharged from the treatment zone with sudden or material decrease of pressure. Characteristics of this mode of operation are, in general, that for a given rotor speed the capacity or rate of throughput for stock of given consistency varies with the feed pressure; that for a given feed pressure the character and/or degree of finishing varies with the zone or gap pressure and/or the extent or length of the zone or gap; that the amount of cutting or shortening of the fibres is uniformly negligible compared to the amount of fibrillation and/or wetting or hydration, whatever the feed and/or gap or zone pressures employed; and that defibering, i. e. the breaking down of bundles of fibers into smaller groups or single fibers, is a constant factor regardless of the degree or character of wetting or hydration.

In view of the widely varying peculiarities of different kinds of stocks and the different treatment characteristics required for various ultimate products, my invention further contemplates testing the treated material and then adjusting the feed and/or gap or zone pressure and/or length of gap or zone to increase or diminish the extent of "finishing" required to render the material suitable for its intended purpose. The gap or zone pressure may be adjusted by regulating the rotor speed, by increasing or decreasing pressure on the stator, or in any other suitable manner.

To summarize therefore, my invention so far as it relates to the treatment of fibrous materials in a fluid medium includes broadly apparatus wherein means are provided for subjecting a supply of the stock to initial or feed pressure, removing successively presented small portions of the supply from the initial or feed pressure condition to a treatment zone, and there subjecting said separated small portions simultaneously to treating forces under increased pressure to effect defibering, wetting and/or hydration, and fibrillation substantially without cutting or shortening of the fibers. If the circumstances require, a further operative step includes testing a treated portion of the material and adjusting the time of treatment and/or the feed or gap or zone pressure to change the character and/or degree of treatment.

A further object among others of my invention has been to provide a mill or machine of the type wherein a centrally mounted rotor cooperates with a stator or series of stators radially arranged in relation to the rotor and individually and/or collectively adjustable toward and away from the same to permit regulation not only of the duration of treatment in the treatment zone, i. e. length of the zone, but also of the effective zone pressure, differentially if desired in respect to the several individual shoes or stators and/or as between one group of stators and another group of stators. The variables of time and pressure involved in this control feature are related more particularly to control over the character of the product in so far as it is affected by the duration and/or intensity of treatment applied in the shearing gap or treatment zone.

Another aspect of my invention includes provision for regulating the capacity of the apparatus to meet various output requirements by controllably adjusting the feed pressure and/or for maintaining a predetermined capacity or rate of output by controllably restricting or limiting variation in the feed pressure of the material fed to the machine.

A further object of my invention has been to provide a stuff treatment or preparation machine in which radially arranged stator and/or spacing units are individually removable and interchangeable with each other and in which wearing parts, as shoes, are readily removable and replaceable.

A further object of my invention has been to provide in a stuff treatment machine to which material is fed under pressure and treated under pressure, means for effectively opposing excessive leakage, as between the rotor and the stator and as between adjacent stators where the apparatus embodies a plurality thereof or where spacing blocks or auxiliary inlet units or both are interposed between stator units. It is a further object of my invention to provide suitable construction whereby that portion of the material or medium which leaks out of the machine is collected and discharged along with or separately from the finished product as desired.

One embodiment of apparatus adapted for use in connection with the treatment or preparation of paper stock or the like is illustrated in the accompanying drawings attached to and forming a part of the present specification and in which—

Figure 2:
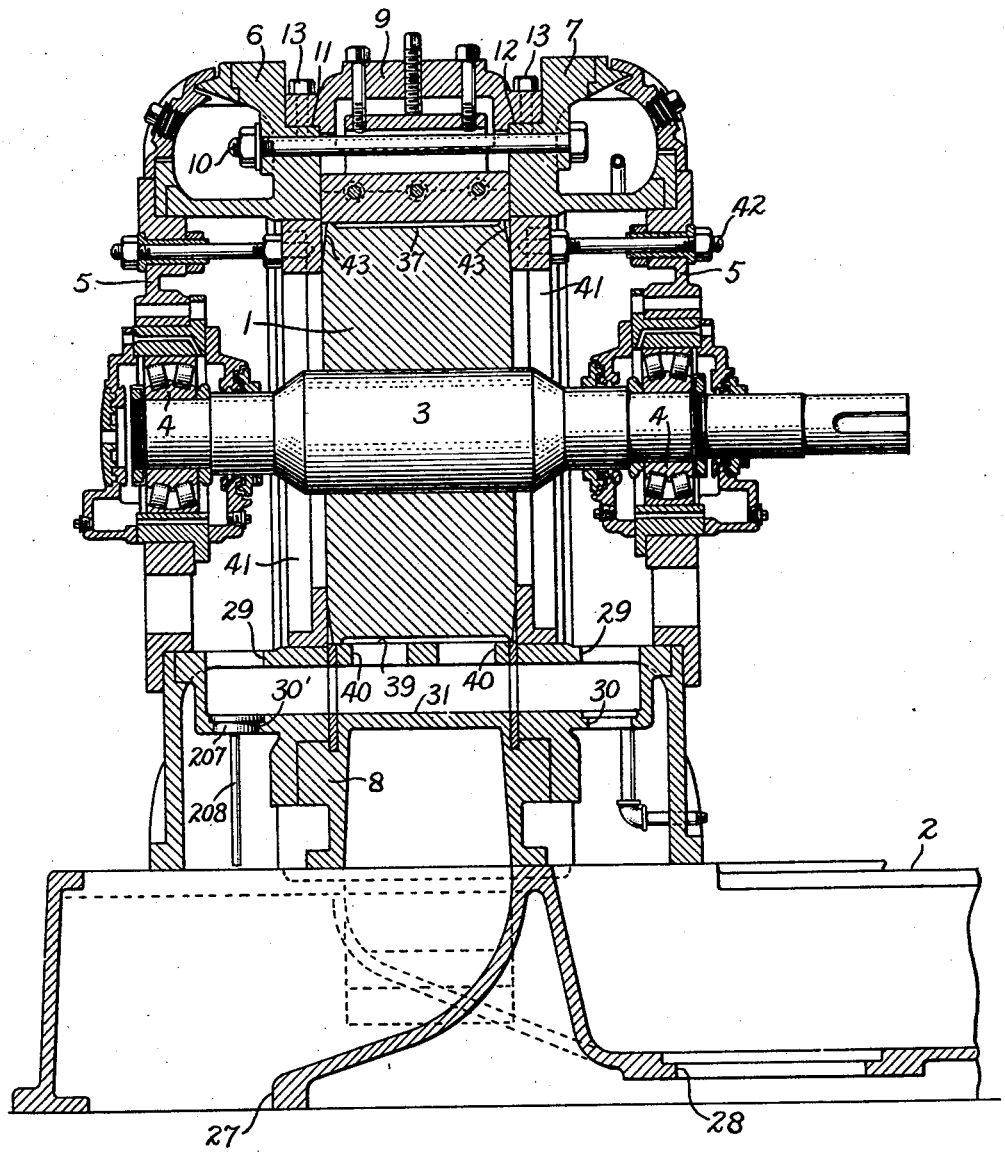
Figure 3:
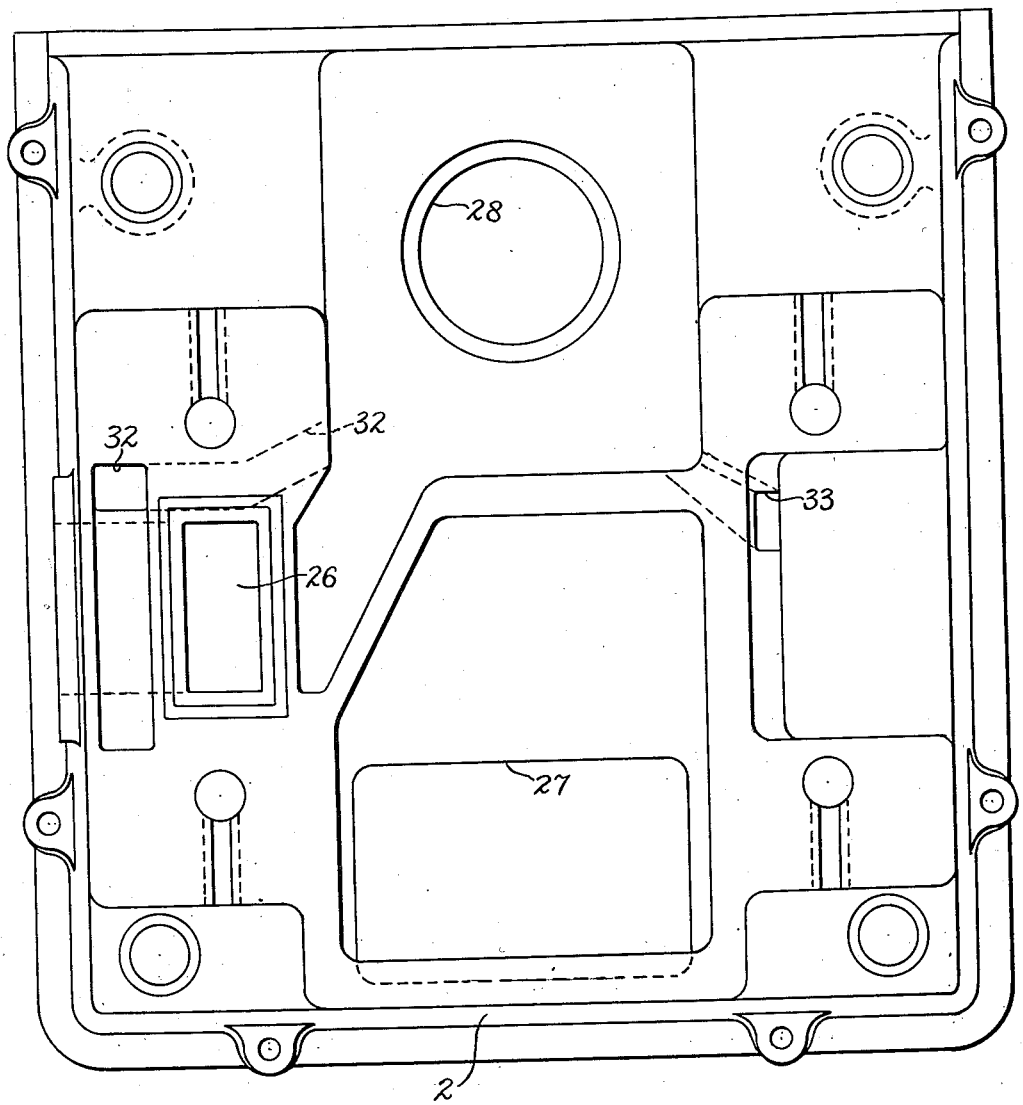
Figure 13:
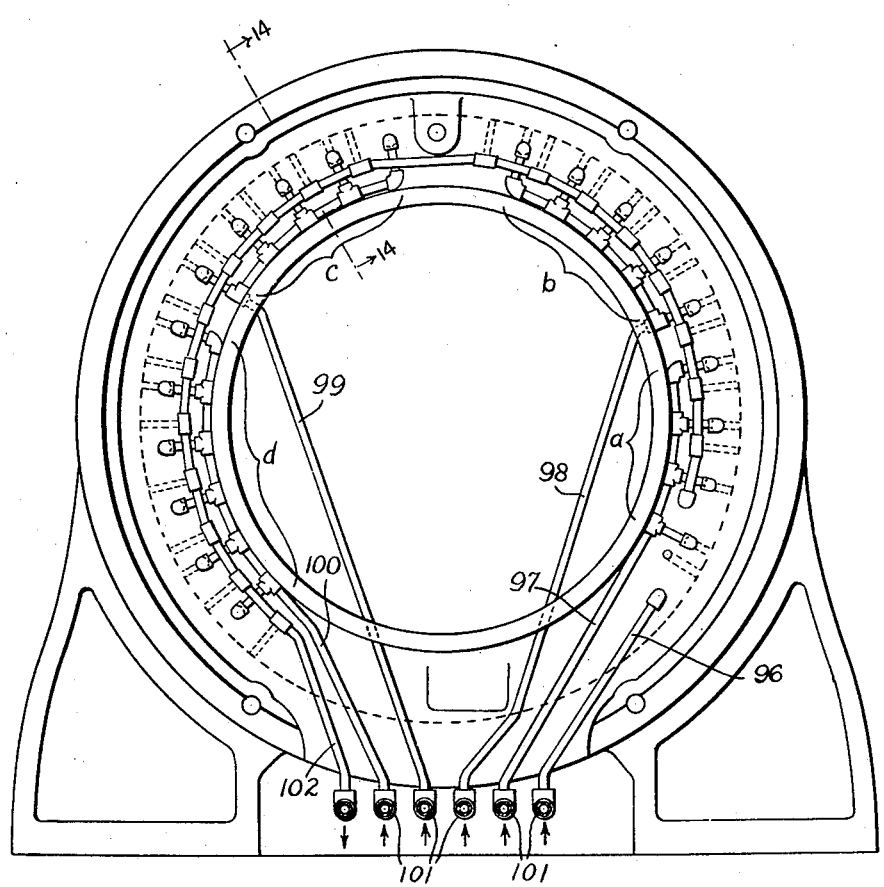

Figure 1 is a front end elevation with outer parts thereof removed to disclose interior portions and with other structural features shown in vertical section;

Figure 2, a section on the line 2—2 of Figure 1;

Figure 3, a plan view of the base member upon which the stator and rotor supporting frames are mounted;

Figure 4, a fragmentary detail in section illustrating, on an enlarged scale, the rotor groove and land contours;

Figure 5, a view partly in vertical section of a modified form of mill with a trash discharge device and shoe pressure control devices;

Figure 6, a horizontal section on the line 6—6 of Figure 5;

Figure 7, a side elevation of a form of stator unit and fluid pressure connections thereto employed in the construction shown in Figure 5;

Figure 8, a longitudinal section illustrating interior portions of the removable stator unit in Figure 1, including the controllably adjustable shoe and hand operated control valve;

Figure 9, a vertical section on the line 9—9 of Figure 8;

Figure 10, a section on the line 10—10 of Figure 8;

Figure 11, a section on the line 11—11 of Figure 8;

Figure 12, a diagram illustrating connections between the shoe pressure cylinders, and shoe pressure control devices;

Figure 13, a rear elevation of the mill illustrated in Figure 1 with the cover plates removed to show more clearly the piping connections to the rear frame for admitting fluid pressure to the shoe actuating cylinders and for disposing of waste therefrom.

Figure 14:
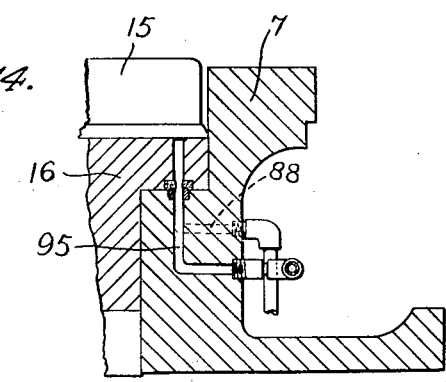

Figure 14, a fragmentary section through the rear frame on the line 14—14 of Figure 13; and Figure 15, a diagram illustrating a form of feed pressure control mechanism applied to a mill or similar treating device.

In the machine shown in the drawings, a rotor 1, having peripheral grooves 37, is mounted to rotate in the direction of the arrow, Figure 1, in a superstructure supported on a base 2 and is driven through shaft 3 by a motor or other power source, not shown. Shaft 3 is journaled in bearings 4 mounted in spiders 5, one of which is opposite a front frame 6 and the other of which is opposite a rear frame 7, said frames being spaced apart by suitable means, as, at the bottom, by a casting 8 and at the top by a spacer 9. A tie bolt 10 passes through upper portions of both frames and the spacer 9. Another tie bolt 14, Figure 2, passes through lower portions of said frames and through said casting 8.

The inner face of frame 6 forms an annular shoulder 11 and the inner face of frame 7 forms an annular shoulder 12. Bolts 13 secure the spacer 9 in operative position between the frames 6 and 7. As shown in Figure 1, the mill is provided with a plurality of radially arranged stator units removably mounted between frames 6 and 7 and including cylinder caps 15 secured to the shoulders 11 and 12 by bolts 17 passing through end portions of cylinder blocks 16. Each stator unit, Figures 8 to 11 inclusive, also includes a shoe carrier 18 movable in a radial direction toward and from rotor 1 and having a dovetail slot 19 adapted to releasably retain a shoe, as 20 or 21. The shoe 20, hereinafter designated the first shoe, is preferably of suitable metal and fitted with a projecting nose 22. The shoes 21 may be made of wood, metal or other suitable material, depending on the conditions of use.

The working faces of the shoes may be continuous or plain, Figure 5, for some purposes, or, as shown in Figure 1 and Figures 8 to 11, may be provided with grooves 205 and/or recesses 206 as small drill holes. It has been found that with the grooved and/or recessed shoe a greater amount of power can be effectively applied to the same character of stock under treatment.

In the space between the first shoe 20 and the last shoe 21, suitably formed castings provide a feed inlet chamber or passage 23, a stock discharge or outlet passage or chamber 24, and a trash discharge passage or chamber 25. The inlet passage 23 communicates with a feed inlet opening 26 at one side of the base 2 and, as shown in Figures 2 and 3, the discharge chamber 24 communicates with a discharge opening 27 near the front end of the base. A drain opening 28, in base 2, connects with the trash discharge passage 25 and also receives waste or leakage through seal ring drain passages 29, 30, 31, Figure 2, and other drain passages 32 and 33, Figures 1 and 3. A removable cover 34 closes an opening into the feed inlet chamber 23 and a removable cover 35 closes an opening into the discharge passage or chamber 24. A doctor bar 36 extends across said chamber opposite the last shoe 21 and is adjustable toward and from the rotor periphery. Another transverse bar 38 is mounted in the feed chamber 23 opposite the first shoe 20 and is adjustable toward and from the rotor periphery. A small chamber 39 between said bars 36 and 38 connects with the drain passage 31 through openings or ducts 40.

The drain passage 31' connects with the stock discharge chamber and opening 27 so that, under some circumstances, leakage stock may be carried into the finished stock. A removable plug 207 having a handle 208 is seated in the drain passage 30' when it is desired to route the leakage material to drain 28 through passage 30. By opening passage 30' and closing passage 30 by means of plug 207, the leakage material runs into the stock discharge chamber.

As indicated more clearly in Figure 2, seal rings 41 are held in position by adjusting bolts 42 opposite peripheral edge portions of rotor 1 which are provided with radial grooves 43. During rapid rotation of the rotor 1 counter-pressure develops in grooves 43 to oppose leakage from the rotor ends without the use of packing or of frictional contact between the rotor and rings 41.

As seen more clearly in Figures 9, 10 and 11, undercut grooves 44 are provided in the sides and ends of stator cylinder blocks 15 which, by intercepting solid particles, bring about the formation of leak opposing barriers between the contiguous surfaces of said blocks and between the ends of the blocks and adjacent surfaces of the front and rear frames. Similar grooves 45' arranged vertically on the ends of shoes 63, Figure 5, perform a similar function.

In normal operation of a mill of the type thus far described, the furnish or material for treatment, where it comprises up to 10% of wood pulp in water for example, is forced in a continuous supply under suitable pressure through inlet opening 26 and feed chamber 23 into contact with the grooved periphery of rotor 1 which, in a preferred embodiment, attains a peripheral speed of about 12000 feet per minute. Particles of suitable size are forced by the feed pressure into the peripheral grooves 37 each of which, in the mill as shown in Figures 4 and 5 is around ⅜ inch wide, decreasing in depth rearwardly from a maximum of approximately .08 inch near its leading edge to the land between its rear edge and the next groove and defining a substantially stream line contour of the leading face of the land which is believed to produce a combined scouring and wiping effect in operation. It will be understood that these dimensions and the shape of the grooves may be varied to meet different conditions of use. During rotation, each groove of the rotor, as it passes the feed chamber 23, picks up a small amount of pulp, depending on the amount of the feed pressure, which therefore determines the mill's capacity or rate of throughput, and carries it into the treatment zone or shearing gap where it is subjected to the intended treatment, provided the material presented is of suitable size to pass the inlet opening to said zone. In respect to any given kind of stuff, the insufficiently reduced particles and foreign objects such as pieces of wire, gravel, glass, etc. and other trash therein accumulate against or adjacent to the front face of shoe 20 and, unless removed, eventually obstruct the supply of stock to the treatment zone.

A suitably controllable gate or valve 45, Figure 1, mounted on a shaft 46, is interposed in an opening between the feed chamber 23 and the trash chamber 25. One end of said shaft 46 extends through a front wall of the machine and, in a hand operated embodiment, carries an operating lever 47, Figure 15. As the gate 45 is rocked rearwardly against the incoming supply of material the effective cross sectional area of chamber 23 is constricted, thus producing a correspondingly increased velocity of the stuff stream which now scours past the shoe nose 22 dislodging the trash accumulation and discharging it freely into the trash chamber 25. This purging or cleaning effect may be aided by flushing with water through a nozzle or nozzles suitably positioned, as adjacent to the nozzle 48 at the end of pipe 121, for example, across the face of shoe 20 and nose 22, said nozzle or nozzles being mounted in and extending through a block 49 carrying side plates 50, the inner edges of which are brought close to the rotor by manipulating adjusting screws 51 and when so positioned, opposite leakage of stock from the feed chamber. The gate 45 carries a suitable flexible contact strip 52 of rubber, rubberized fabric or the like, to provide an effective closure across the end of said gate and to prevent injury to the parts in case the gate is closed against a rigid foreign object or substance. The arrows and direction lines in Figure 1 indicate the course of the stuff stream when the gate is in its intermediate partly open position, suggested by dotted lines 45'. Where the gate is retracted to dotted line position 45" the feed stream is substantially shut off and the purging or cleaning out of trash may be completed by flushing with water if necessary or desired.

In the modified form of mill shown in Figure 5, a peripherally grooved rotor 61 is mounted in treatment zone or shearing gap forming relation to individually adjustable stators 62 provided with removable shoes 63. A suitably shaped casting provides a stuff inlet chamber 64 having a lateral inlet opening 65. Material to be treated, i. e. pulp, is fed into said chamber under suitable pressure, and subjected to treatment in the shearing gap or between the rotor periphery and the shoe 63. The finished stock is discharged into chamber 66, portions thereof being guided by a doctor 67 supported at the end of a doctor plate 68. A discharge opening or delivery spout 69 receives and discharges the treated product from the mill.

As applied to the preparation, refining or finishing of fibrous cellulose material in paper and board manufacture, apparatus of the types shown in Figures 1 to 5 inclusive, when operated in connection with suitable methods, provides a stock refining action which produces a high degree of "wetting" in relation to the amount of "cutting". For practical purposes, it may be said that the apparatus produces wetting without cutting, the reduction in fiber length being so small as to be negligible. In this respect said apparatus is free from the operating limitations inherent in machines of the Hollander and Jordan types and others in which increased "wetting" effect is always accompanied by increased cutting.

As in the case of the mill first described, trash usually accumulates in the feed box adjacent to the rotor during operation. Clean out or purging means for this waste material include a trash discharge chamber 70 having an outlet 71 at one side, Figure 6, and a water inlet 72 at the opposite side. A valve or gate 73 is pivotally mounted in a suitable opening between stock inlet chamber 64 and trash discharge chamber 70, said gate having a flexible edge piece 74, as of rubber or rubberized fabric, which bears against a shoulder 75 when valve 73 is in closed position. A packing strip 76 extends across the opposite edge of valve 73 and opposes leakage past said edge and the adjacent curved wall 77. Suitable means such as the hand operated lever 47, Figure 6, may be employed to actuate valve 73. However, when valve 73 is moved toward open or dotted line position, Figure 5, the scouring effect of the stuff stream is initially confluent with the direction of rotation of rotor 61 and the obstructing matter is dislodged and discharged into chamber 70 from which it is flushed out by water jet 72 through said trash discharge outlet 71. The specific forms and arrangements of the trash valves or gates described in this specification constitute a separate but related joint invention made by James T. Coghill and myself and forms a part of the subject matter of another and separate application Serial No. 717,718, filed March 28, 1934, which matured into Patent No. 2,042,566, June 2, 1936.

As applied to paper making and the like, the purging apparatus not only makes practical the use of continuously operating defibering, fibrillating or wetting machines for example, but also protects said machines and the quality of the ultimate board or paper product. In box board manufacture, substantial economies are effected by eliminating a considerable part of the hand sorting and cleaning of the raw waste stock. These advantages are of course additional to the novel and effective stuff finishing capabilities of the mill and the wide range of control which it affords over the extent and character of stuff treatment.

To achieve effective control over the character and/or extent of treatment of the stuff fed to the mill, each shoe carrier 18 is mounted at the ends of rods 79 of pistons 81 operating in cylinders 80 of the cylinder block 16, Figures 7 to 11 inclusive, and means are provided to controllably move said pistons and therefore the shoes 21 toward and away from the treatment zone or gap.

One kind of treatment zone pressure control involves manual operation of fluid pressure means for raising and lowering each shoe individually and independently of the others, Figure 7. Another kind of control involves automatic operation of fluid pressure shoe raising and lowering means by reference to pressure variations in the feed chamber 23, and may affect all or any group or groups of the shoes either in the same or in different degrees, Figure 12. This feature is particularly useful in a multiple shoe machine where hand adjustment of shoe pressure of individual shoes by reference to feed pressure variations, indicated on a pressure gauge, for example, might under many circumstances be inadequate. However, for a single shoe machine, or in a mill having a moderate number of shoes, the hand control by reference to gauge indicated feed pressure variations is satisfactory under suitable conditions.

In the treatment of sulphite pulp, for example, this being one of many uses for which a mill embodying my improvements may be employed, feed pressures of from 5 to 35 pounds have been used with hydraulic pressures of from 30 to 100 pounds per square inch applied to the shoes through the pistons and thence to the stuff under treatment in the treatment zone, these figures being illustrative and in no sense intended as limitations.

For hand control of shoe pressure by hydraulic or other suitable fluid pressure means, a valve is provided to control the admission of fluid under pressure to one side or the others of pistons 81, one of which is preferably provided with a telltale in the form of a rod 150 indicating by its up or down position whether or not the shoe is up or down in relation to the rotor. In the form of device shown in Figures 8 to 11 inclusive, such a valve for actuating a single shoe is conveniently located in the cap 15 and comprises a truncated conical cock 82 having an exposed end 83 shaped to fit a suitable socket wrench.

A longitudinal passageway 84 extends through a retaining nut 85 which bears against a spring 86 interposed between said nut and the bottom face of the cock 82. A fluid inlet or pressure supply duct 87 in the cylinder block connects with a duct 88 opening through the annular surface of shoulder 12 of rear frame 7. A port 89 in cock 82 is positioned to communicate with a passage 114 leading to the lower side of piston 81 and another port 90 communicates with a passage 113 leading to the upper side of said piston, depending on the position of rotation of said cock 82. A lateral recess 91 is positioned therein to communicate with a relief or bleed duct 92 in cap 15 when port 89 is turned to operative pressure admitting position while a similar lateral recess 93 performs a similar service when inlet duct 90 is in operative pressure admitting position. With the parts positioned as shown in Figure 11, both inlets are inoperative and no pressure is in the cylinders 80. The relief duct 92 communicates with a relief duct 94 which extends through cap 15 and block 16 into a relief outlet 95 opening through the annular face of shoulder 12 of rear frame 7. Fluid, as water under suitable pressure is supplied to the respective pressure supply ducts 88 by the supply pipes 96, 97, 98, 99 or 100, Figure 13, each controlled by a suitable hand valve, as 101. The relief outlets 95 connect with a waste pipe 102 having a valve 303, excepting that outlet 95' of shoe 20, the first shoe, vents freely into the space between the rear frame 7 and rear cover plates, not identified. Pipe 96 supplies fluid pressure to the first shoe 20; pipe 97 to the *a* group of shoes; pipe 98 to the *b* group of shoes, pipe 99 to the *c* group; and pipe 100 to the *d* group, Figure 13.

Under some conditions of use, as where the shoe position and the shoe pressure are controlled entirely by hand operation of valve or cock 82 for single shoes, or by a four way valve 105, Figures 7 and 12, the pressure supply pipes aforesaid, or their equivalent, are connected with a common main or otherwise supplied with fluid at suitable pressure. Where simultaneous control of single shoes or groups of shoes is required and provision is made for applying different pressures to different shoes or groups of shoes, as in a multiple shoe machine, said supply pipes will preferably connect directly or indirectly with a main, each through a suitable and separate pressure regulating mechanism, such for example as those shown in Figure 12.

Referring to Figure 12, water or other suitable fluid under pressure is supplied from main 103 through a strainer 104 to a four way reversing valve 105. With said valve arranged as shown, i. e. to supply pressure to the several pipes 96, 97, etc., a supply pipe 106 connects with each of the supply pipes of the several shoes or groups of shoes through a manually adjustable pressure regulating valve, as 107, which is by-passed by a pipe containing a one way valve 108. A trickle valve 109 connects with the by-pass pipe. In operation, the fluid, as water under pressure, passes regulating valve 107 and while moving pistons 81 into down position for example, and while holding them in said position, vents through pipes 102 and 110, and valve 105 into waste discharge 140.

Where the regulators 107 are set for different pressures, correspondingly different degrees of shoe pressure will be produced as between different shoes or groups of shoes. To release pressure from all the shoes affected by the condition just described, valve 105 is turned to "off" position whereupon pipe 110 becomes the supply pipe and pipe 106 the return or relief pipe receiving the vented fluid through the one way bypass valves 108. A gauge 111 discloses the pressure in main 103 and the several gauges 112 disclose pressures in each of the lines connecting with pipe 106.

Provision is made for a separate independent water or pressure inlet to the first shoe 20 by a pipe 117 communicating directly with the main 103 and having a hand throttle valve 118. This arrangement permits the first shoe, which is preferably of metal for some uses, to be "burned into" the rotor, i. e., to have its shearing surface accurately ground to the rotor contour as a part of the first "tuning up" without, at the same time, applying pressure to the remaining shoes. In subsequent operations, valve 118 remains closed.

For most efficient operation, apparatus of the kind described will preferably be supplied with stuff by feed mechanisms capable of delivering the material into feed chamber 23 at a substantially constant pressure. Means are also provided for adjusting such devices to feed stuff substantially constantly at different pressures within a suitably wide range. These controls relate particularly to the mill capacity or rate of throughput. So far as the feed pressure is regulatable over a wide range, the mill capacity is widely flexible and capable of satisfying different volume demands; and so far as the controls maintain a given pressure substantially constant, the capacity or throughput remains substantially uniform. In the refining, finishing or wetting of wood pulp, for example, these features are especially important, both in actual production and in their relation to economy in plant equipment.

As shown in Figure 15, stock is fed to the mill inlet from a supply chest 201 through a stock supply conduit 151 by means of a suitable pump 152. A gauge 153 registers pressure in said conduit which includes a T section 154 having one outlet opening toward the mill and another toward a return conduit 155 positioned to discharge into chest 201. For stocks wherein the consistency is up to about 4%, a Feeney type return control or regulator may be interposed in the return line. One form thereof includes a valve plug 156 mounted on a lever 157 pivoted at 158 and having removable weights 159 suspended at its free end. In operation, with a given calibration and setting of the parts described, stuff is forced upwardly through conduit 151 by pump 152. A sufficient amount thereof to substantially maintain the predetermined feed pressure is forced into the feed box or chamber of the mill. Any excess of pressure, causes overflow or return of stock past valve plug 156. As will be readily understood, the feed pressure in conduit 151 is increased by adding weights to 159 and diminished by removing weights therefrom.

In starting a run on a machine provided with said control features, the feed pressure control is set to deliver to the feed chamber a volume of material at the required pressure. Valve 105 is turned to the pressure supplying position shown, Figure 12, and the shoes, one by one or group by group as needed or desired, are moved toward effective stuff treating position with uniformly or differentially increasing pressure, depending on the setting of the differential controls, until the feed box pressure reaches the predetermined value fixed by the setting, at which point a balance is established between feed pressure and shoe pressure as previously explained. If inspection of the product shows that the stock needs more or less treatment, the result may be reached by suitably regulating valve 246, for example, by adjusting any or all of the differential regulating valves related to the several pipes leading to the shoes, or in any other manner which will increase or diminish the energy expenditure on the stock in process of treatment. The controls will then, of course, tend to maintain the new conditions of treatment.

The apparatus herein described and more particularly involving the grooved rotor construction forms the subject matter of a separate application Serial No. 120,312, filed January 12, 1937.

The subject matter herein relating to apparatus for removing trash or junk is more particularly claimed in another separate application, Serial No. 134,461, filed April 2, 1937.

The subject matter relating to leak arresting devices herein described and shown is claimed in another separate application, Serial No. 120,314, filed January 12, 1937.

The subject matter herein relating to a special form of stator shoe is more particularly claimed in another separate application, Serial No. 120,313, filed January 12, 1937.

I have found that by employing my apparatus hereinabove described in the preparation of paper stock I have produced an intermediate product having novel properties which present material advantages in paper manufacture and the like. For example, the described treatment permits the refining, wetting, or finishing of pulp to be carried to any desired degree without cutting or reducing the fiber length, which means that hydration or wetting may be effected independently of cutting. If for any given paper machine or paper product, more cutting is needed to facilitate sheet formation after the stock has reached approximately the desired degree of wetting, this can be done by a relatively short treatment in a Jordan or other cutting machine, or the required amount of a shorter fibered pulp may be added to the run either before or after the wetting or finishing treatment.

Furthermore, my improved apparatus produces a completely defibered pulp, i. e. a finished pulp practically free of "fish eyes", slivers, lumps, or other defects, as the necessary result of practically any degree of finishing treatment sufficient or suitable for paper making purposes. Pulp defects of this kind, according to known paper mill practice, are avoided or disposed of only by long and most exacting and consequently expensive beater or equivalent treatment. Some other advantages among many residing in the defibering capabilities of my apparatus are that the pulp may be finished with less prolonged previous cooking and, under proper conditions, broke may be refinished after a simple breaker treatment instead of rerouting it through beaters or other time and power consuming devices.

Numerous other advantages and beneficial results in the operation of my above described apparatus, including substantial economies in time and power, will be clearly apparent to the skilled paper maker.

I claim:—

1. Stuff treatment apparatus comprising a rotor, a rotor and stator supporting frame, a plurality of stator carriers mounted thereon in radial relation to the rotor, a stator for each carrier movable toward and away from the periphery of said rotor, fluid pressure means for actuating said stators, and means for maintaining a pressure differential between any one and any other of said stators.

2. In stuff treatment apparatus, the combination of a rotor, a stator cooperating with a peripheral surface of said rotor to form therewith a stuff treatment zone, means for delivering material under pressure to one end of said zone in advance of the stator, a gauge positioned to indicate the feed pressure of said material, means for applying fluid pressure to said stator, and manually operable stator pressure control means cooperating with said fluid pressure applying means to increase the amount of said fluid pressure upon an indication of increased feed pressure and to decrease said fluid pressure upon decrease of feed pressure from a predetermined value.

3. In stuff treatment apparatus, the combination of front and rear frames provided with concentric annular openings to receive a rotor, a rotor mounted therein, a plurality of cylinder blocks mounted between said frames and having cylinders arranged radially in relation to the rotor, a piston for each cylinder, stator shoes mounted on said pistons, fluid pressure ducts extending through portions of one of said frames and communicating with said cylinders, and a valve for controlling the direction of the fluid pressure supply in said ducts.

4. A stator unit for stuff treatment machines in which a stator cooperates with the periphery of a rotor to form a stuff treatment zone, comprising a cylinder block having a cylinder bore, a piston mounted therein, a shoe carrier secured to one end of the piston, and a shoe removably secured to the carrier.

5. Stuff treatment apparatus for treating material in liquid form or carried in a liquid medium by passing said material through a treatment zone, comprising a casing, a rotor therein having edge portions of its periphery continuously cylindrical and an intermediate portion provided with transverse grooves, a stator therein positioned in adjustable relation to the periphery of said rotor and forming between them a treatment zone, and said casing being provided with partitions which cooperate with edge portions of the periphery of the rotor to form a feed chamber at the inlet of the treatment zone and a discharge chamber at the outlet of the treatment zone, and means for feeding material to said feed chamber under pressure whereby the material to be treated is first admitted to said feed chamber, passes through the treatment zone with and in the direction of rotation of the rotor and is then discharged into said discharge chamber.

6. Apparatus according to claim 5 and further characterized in that the stator is movable in relation to the rotor periphery by fluid pressure means, and regulating means operatively connected to said fluid pressure means are provided to maintain a pressure on material in the treatment zone between the rotor and the stator.

7. Apparatus according to claim 5 and further characterized in that material in the treatment zone is subjected to pressure between the rotor periphery and the stator, and fluid pressure means are provided for transmitting pressure to said material through said stator, and pressure controlling means are connected to said fluid pressure means to controllably vary the pressure transmitted to the material through said stator.

8. Stuff treatment apparatus for paper pulp or other material, comprising a casing with inlet and outlet ports, a rotor mounted to rotate in the casing and having its working face on its periphery, independent stators in the casing movable towards and away from the working face of the rotor, fluid pressure means connected with said stators to move the stators toward the rotor, and means to control said fluid pressure means to vary the effective pressure of each stator upon material between the working face of the rotor and the stators.

9. Stuff treatment apparatus for paper pulp or other material, comprising a casing with inlet and outlet ports, a rotor mounted to rotate in the casing and having its working face on its periphery, independent stators in the casing movable toward and away from the working face of the rotor, fluid pressure means connected with said stators to move the stators towards and away from the rotor, and means to control said fluid pressure means to vary the effective pressure of each stator singly and of all stators simultaneously upon material between the working face of the rotor and the stators.

10. Stuff treatment apparatus for paper pulp or other material comprising a casing with inlet and outlet ports, a rotor mounted to rotate in the casing and having its working face on its periphery, independent stators in the casing movable towards and away from the working face of the rotor, fluid pressure means connected with the stators to move the stators towards and away from the rotor, and valve mechanism to control said fluid pressure means to vary the effective working pressure of each stator.

11. Stuff treatment apparatus according to claim 10 and wherein the fluid pressure means includes cylinders closed at one end and connected to the casing, pistons mounted in said cylinder, and piston rods connected to said pistons and having end portions to which the stators are detachably connected.

12. Stuff treatment apparatus comprising a base, a casing with inlet and outlet ports and including end members, bearings on said end members, a shaft mounted in said bearings and passing through and co-axial with said casing, a rotor on the shaft within the casing, independent stators mounted between said end members, fluid pressure cylinders mounted on the casing, pistons in the cylinders and connected to the stators, a source of fluid pressure, and pipe and valve connections whereby the stators may be selectively and collectively moved toward and away from the rotor.

13. A refining engine for paper pulp, comprising a casing with inlet and outlet ports, a rotor mounted to rotate in the casing and having its working face on its outer periphery, independent bed-plates in the casing slidable towards and away from the working face of the rotor, hydraulic means cooperating between the casing and the bed-plates to feed the bed-plates towards and away from the rotor, and valve mechanism to control said hydraulic means to vary the effective pressure of each bed-plate against the rotor.

CHARLES P. TOLMAN.

CERTIFICATE OF CORRECTION.

Patent No. 2,087,556.                                                                               July 20, 1937.

CHARLES P. TOLMAN.

It is hereby certified that error appears in the printed specification of the above numbered patent requiring correction as follows: Page 3, second column, line 6, for the word "opposite" read oppose; and that the said Letters Patent should be read with this correction therein that the same may conform to the record of the case in the Patent Office.

Signed and sealed this 21st day September, A. D. 1937.

Henry Van Arsdale (Seal)                                                     Acting Commissioner of Patents.